J. S. NURNBERGER.
BRAKE OPERATING LEVER.
APPLICATION FILED APR. 15, 1916.
1,187,770. Patented June 20, 1916.
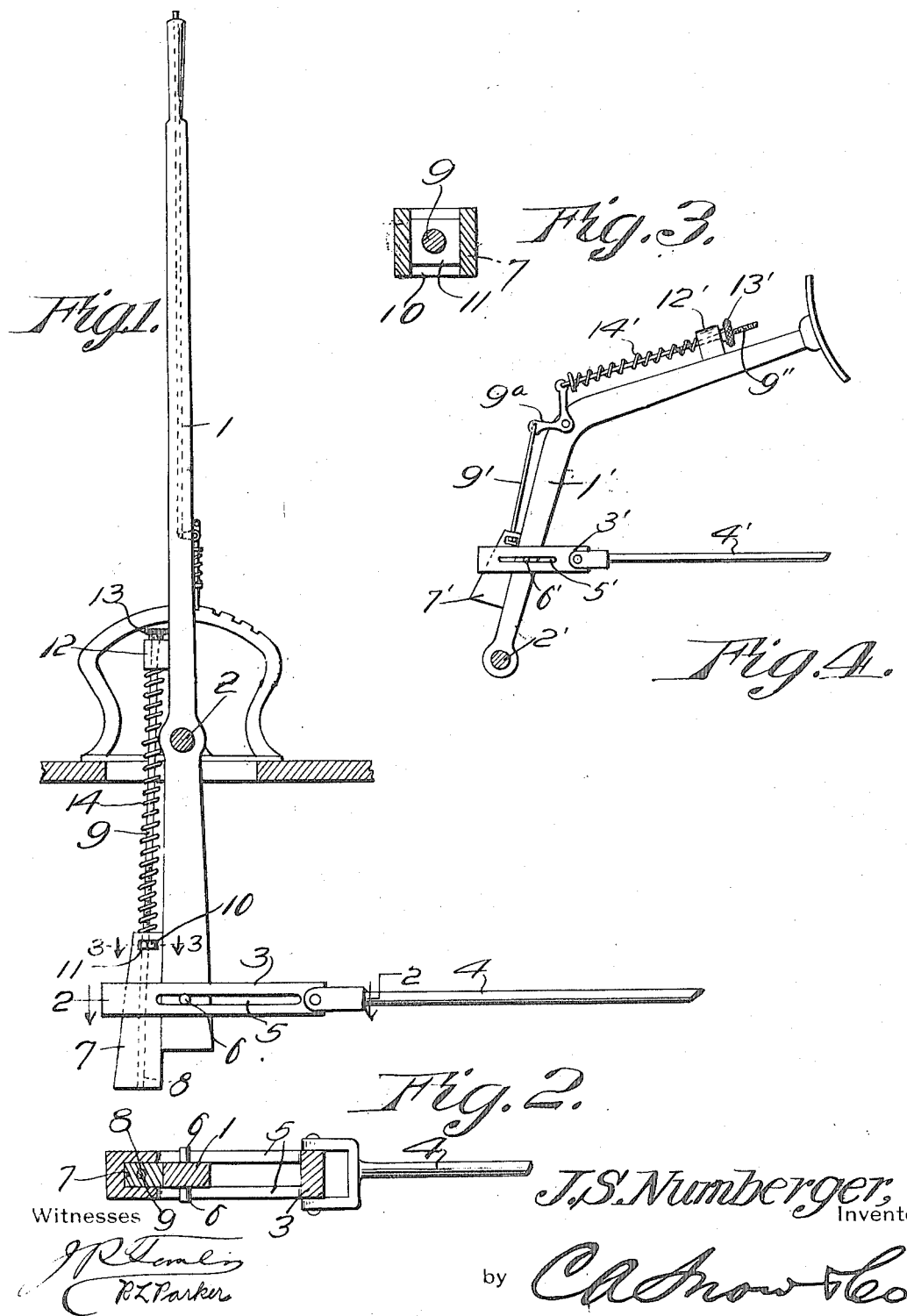

UNITED STATES PATENT OFFICE.

JOSEPH SAMUELS NURNBERGER, OF ST. ALBANS, WEST VIRGINIA.

BRAKE-OPERATING LEVER.

1,187,770.

Specification of Letters Patent.

Patented June 20, 1916.

Application filed April 15, 1916. Serial No. 91,410.

*To all whom it may concern:*

Be it known that I, JOSEPH S. NURNBERGER, a citizen of the United States, residing at St. Albans, in the county of Kanawha and State of West Virginia, have invented a new and useful Brake-Operating Lever, of which the following is a specification.

The present invention appertains to levers, and aims to provide novel and improved means for adjusting a rod or link, which is connected to a lever, relative to said lever.

The present improvements are especially useful in connection with the device for operating automobile emergency brakes, since the rod which connects the hand lever with the brakes can be adjusted relative to the lever, in order that the brakes will be operated properly and effectively.

Another object of the invention is the provision of means of the nature indicated which permits the rod to be adjusted relative to the lever from the lever, in order that the operator can readily make the adjustment without leaving his seat.

It is also within the scope of the invention to provide a device as above specified which is extremely simple, compact and inexpensive in construction, as well as being thoroughly practical and efficacious for its intended purposes.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

The invention is illustrated in the accompanying drawing, wherein:—

Figure 1 is a side elevation of the invention. Fig. 2 is a sectional detail taken on the line 2—2 of Fig. 1. Fig. 3 is an enlarged sectional detail taken on the line 3—3 of Fig. 1. Fig. 4 is a side elevation illustrating a modification.

The numeral 1 designates the hand lever for applying the emergency brakes, although the invention can be used upon various other levers, and the lever 1 is fulcrumed, as at 2, to any suitable support.

The invention includes a loop-shaped or slotted member 3 through which the lower arm or terminal of the lever 1 projects loosely, and to one end of which the rod or link 4 is attached, said rod or link being connected to the brakes (not shown), and being operated by the lever 1 for applying and releasing the brakes as usual. The longitudinal side portions of the member 3 are provided with longitudinal slots 5 and the lower arm of the lever 1 has outstanding lugs 6 projecting through the slots 5, whereby to support the member 3 for longitudinal adjustment of itself, which is accomplished through the medium of an upwardly tapered wedge 7 disposed between that edge of the lever 1 remote from the rod 4 and the respective end of the member 3.

The wedge 7 is adjusted longitudinally of the lever, for adjusting the member 3 transversely of the lever, and to this end, the wedge 7 has a longitudinal bore 8 receiving the lower terminal of a rod or screw 9 extending longitudinally along one edge of the lever 1. The wedge 7 has a transverse opening 10 adjacent its upper smaller end in which is fitted a nut 11 through which the lower terminal of the screw 9 is threaded, said nut being held non-rotatably within the opening 10, whereby when the screw 9 is rotated, it will be adjusted longitudinally relative to the wedge, to accomplish the adjustment of the wedge. The upper terminal of the rod or screw 9 projects rotatably through an outstanding lug 12 carried by the lever 1, and a thumb piece or knob 13 is secured to the upper terminal of the screw 9 and seats upon the lug 12. The knob 13 is readily accessible to enable it to be rotated for adjusting the wedge 7 and is held seated upon the lug 12 by means of a coiled wire expansion spring 14 surrounding the screw 9 and confined between the lug 12 and smaller end of the wedge. This also moves the wedge downwardly until stopped by the knob 13 striking the lug 12.

By rotating the knob 13 in one direction, the screw 9 is unscrewed relative to the nut 11, which permits the wedge 7 to move downwardly under the influence of the spring 14, so that the rod 4 can move slightly away from the lever 1. When the knob is rotated in the other direction, the wedge 7 is moved upwardly, thereby providing a wedging action between the lever and member 3 to draw the rod 4 toward the lever. It is thus possible to adjust the rod 4 relative to the lever by properly rotating the knob 13, in order that the brakes or other device operated by the lever will act properly.

Fig. 4 illustrates the invention applied to an angular foot lever or treadle 1' which is fulcrumed at 2'. The loop-shaped or slotted member 3' engages the lever 1' adjacent the fulcrum 2', and has the rod 4' attached to one end thereof. The member 3' has the slots 5' receiving the lugs 6' outstanding from the sides of the lever 1', and a wedge 7' is disposed between the lever and that end of the member 3' remote from the rod 4'. A rod or link 9' extending along the lever 1' is connected to the smaller end of the wedge 7' and to one arm of a bell crank lever 9ª fulcrumed to the angle of the lever 1', and a second rod 9" is pivoted to the other arm of said bell crank lever and is slidable through a lug 12' with which the lever 1' is provided adjacent its free end. A nut 13' is threaded upon the rod 9" and seats against the lug 12', and a coiled wire expansion spring 14' is disposed upon the rod 9" between the lug 12' and lever 9ª, to move the wedge 7' downwardly. When the nut 13' is rotated, this will result in the adjustment of the rod 9", the bell crank lever 9ª transmitting the motion to the rod 9' to which the wedge 7' is connected, whereby said wedge will be adjusted longitudinally of the lever to adjust the member 3' and rod 4'.

Having thus described the invention, what is claimed as new is:

1. In a device of the character described, a lever, a member connected to the lever to be operated thereby, and means for adjusting said member transversely of the lever including a member movable longitudinally of the lever.

2. In a device of the character described, a lever, a wedge resting thereagainst, a member having a portion bearing against said wedge, and means carried by the lever for adjusting said wedge.

3. In a device of the character described, a lever, a member arranged transversely thereof, said lever and member having interengageable means for constraining said member to slide transversely of the lever, and means carried by the lever for adjusting said member including a member movable longitudinally of the lever.

4. In a device of the character described, a lever, a member arranged transversely thereof, said lever and member having interengageable means for constraining said member to slide transversely of the lever, and a wedge movable longitudinally of the lever between the lever and a portion of said member.

5. In a device of the character described, a lever, a member arranged transversely thereof, said lever and member having interengageable means for constraining said member to slide transversely of the lever, a wedge movable longitudinally of the lever between the lever and a portion of said member, and means carried by the lever for adjusting said wedge.

6. In a device of the character described, a lever, a loop-shaped member through which the lever projects, a rod connected to said member, and a wedge disposed between one end of said member and the lever and movable longitudinally of the lever.

7. In a device of the character described, a lever, a loop-shaped member through which the lever projects, a rod connected to said member, a wedge disposed between one end of said member and the lever and movable longitudinally of the lever, and a longitudinally adjustable rod carried by the lever and extending longitudinally thereof, said rod being connected to the wedge.

8. In a device of the character described, a lever, a loop-shaped member through which the lever projects and having longitudinal slots, the lever having lugs projecting into said slots, a rod connected to one end of said member, a wedge disposed between the other end of said member and lever and movable longitudinally of the lever, and means carried by the lever for adjusting said wedge.

9. In a device of the character described, a lever, a loop-shaped member through which the lever projects, said lever and member having means for guiding said member for transverse movement relative to the lever, a rod connected to one end of said member, a wedge disposed between one end of said member and the lever and movable longitudinally of the lever, a longitudinally movable rod carried by the lever and extending longitudinally thereof, said rod being connected to the smaller end of the wedge, and spring means for moving said wedge longitudinally in one direction.

In testimony that I claim the foregoing as my own, I have hereto affixed my signature in the presence of two witnesses.

JOSEPH SAMUELS NURNBERGER.

Witnesses:
L. J. WHITE,
C. A. ZERKLE.